March 20, 1956  T. D. JENNETT  2,738,723
AUTOMATIC COOKING APPLIANCE
Filed Jan. 20, 1954

INVENTOR.
THOMAS D. JENNETT
BY 3. O. St. Palley
Patent Agent

United States Patent Office 2,738,723
Patented Mar. 20, 1956

2,738,723
AUTOMATIC COOKING APPLIANCE

Thomas D. Jennett, New Haven, Conn.

Application January 20, 1954, Serial No. 405,205

2 Claims. (Cl. 99—329)

My invention relates to an automatic cooking appliance for preparing complete meals, consisting of several dishes, in a coordinated sequence.

One of the objects of my invention is to provide an automatic cooking appliance, which will cook the several dishes of a meal, deposited in the appliance, without further attention, offering thereby a great convenience in housekeeping.

Another object of my invention is to provide an automatic cooking appliance, with which the actual working time required for the preparation of a meal is reduced to the arranging and depositing of the uncooked food in said appliance and the time of the cooking may be utilized for other activity, such as for dressing while the breakfast is being cooked, which will greatly benefit those who at present due to their work do not find sufficient time to prepare a satisfactory breakfast.

Another object of my invention is to provide an automatic cooking appliance in which the cooking process of the dishes may be finely regulated insuring the good quality of the meal produced.

Another object of my invention is to provide an automatic cooking appliance in which during the whole cooking process the energy consumption of the heating elements is always maintained at a predetermined low level, making it possible to prepare complete meals at locations where the wiring installation limits the amperage of the electric supply to a low value, such as in furnished rooms, trailers, etc.

A further object of my invention is to provide an automatic cooking appliance which permits a great variety in the combination of the dishes prepared, and is equally applicable for the preparation of the simplest meal, even a single dish, offering thereby a great utility.

Other objects and advantages of my invention will be apparent during the course of the following description.

In the accompanying drawing, forming a part of this application, wherein for the purpose of illustration is shown a preferred embodiment of my invention.

Figure 1:
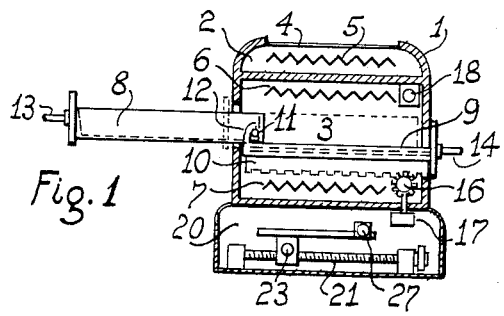
Figure 2:
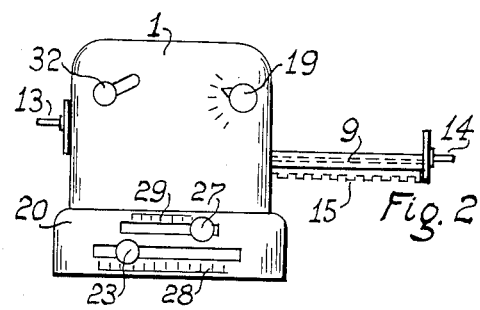
Figure 3:
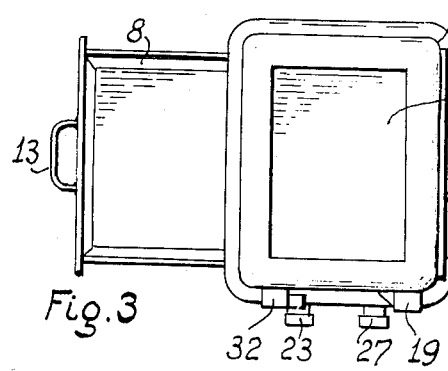
Figure 4:
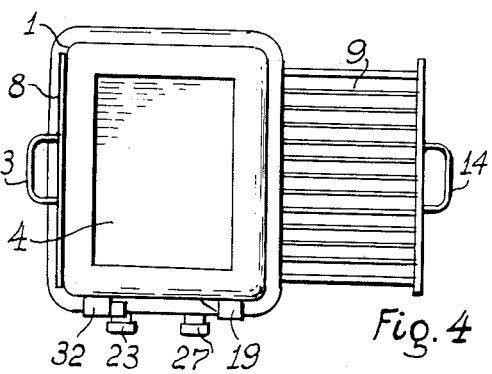
Figure 5:
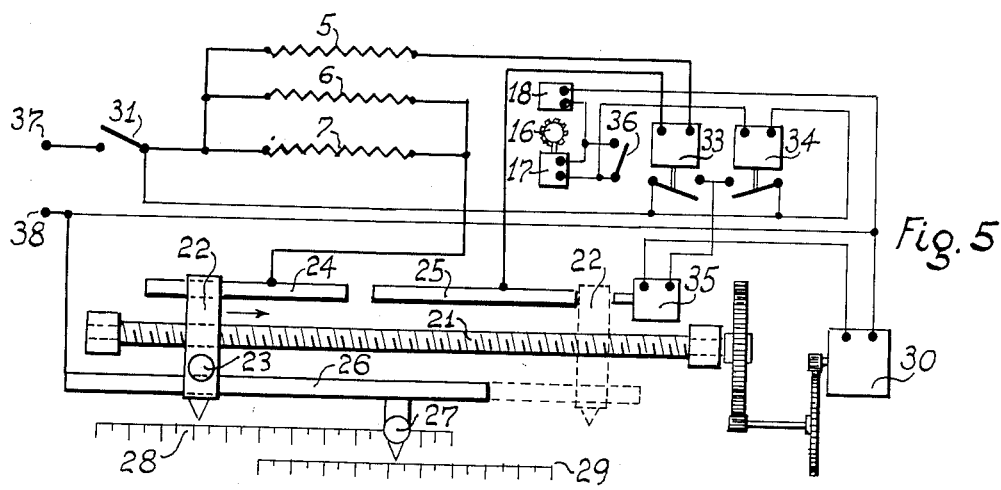
Figure 6:
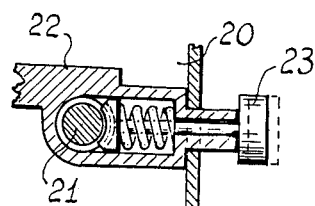

Figure 1 is a vertical sectional view of my cooking appliance, showing the sliding pan drawn out, Figure 2 is a side elevation of said appliance, with the sliding grate drawn out, Figure 3 is a plan view of said appliance with the sliding pan exposed, Figure 4 is a plan view of said appliance with the sliding grate exposed, Figure 5 is a diagrammatic plan of the control system, Figure 6 is a sectional view of the lead screw and the contact adjusting mechanism.

Referring to the drawing, wherein like numerals are employed to designate like parts, in Fig. 1 the numeral 1 designates an insulated housing, having two compartments. The upper, stove-compartment 2 is covered by the hot-plate 4 and encloses the electric heating element 5. The lower, oven-compartment 3 contains two heating elements, 6 and 7, which in the preferred form of this invention have a total capacity equal to the capacity of the element 5.

Disposed between the heating elements 6 and 7 is the pan 8, which is slidably mounted on the grate 9, which latter is slidably mounted on the frame 10. These are so arranged that the pan 8 may be drawn out through an opening located on one side of the housing 1, and the grate 9, together with the frame 10, or without it, may be slid out of the oven 3 through an opening located on the opposite side of the housing 1. Frame 10 is so constructed that, when it is moved outwardly from the oven, its end will engage the grate 9 causing said grate to slide outwardly. The relative motion of said grate 9 and said pan 8 is limited by the stud 11 secured to said pan, and engaging the hook 12 attached to said grate. The effect of this connection between the pan 8 and grate 9 is that, while both may be located simultaneously inside the oven 3, only one of them can be outside of the oven at any time, and the one being outside of the oven will be pulled into the oven by the outwardly motion of the other. Handles 13 and 14 serve to facilitate the handling of said pan and grate, respectively.

Frame 10 is slidably mounted in the housing 1, and is provided with teeth 15 engaging the pinion 16, which is spring-pressed torsionally and tends to revolve so as to move the frame 10 outwardly from the oven 3. Cooperating with said pinion 16 is a solenoid operated ratchet type lock 17, which permits the rotation of the pinion 16 when the frame 10 is moved into the oven, but will lock the pinion, so as to prevent the outwardly motion of said frame, when the solenoid is not energized. The effect of this arrangement is that when the grate 9 is pushed into the oven 3 against the opposition of the spring-pressed pinion 16, it will be retained in the oven by the lock 17 as long as the solenoid of said lock is not energized. The energizing of said solenoid will release the lock permitting the spring-pressed pinion 16 to move the frame 10 and the connected grate 9 out of the oven 3, and to move simultaneously the pan 8 into the oven 3.

An important element of this appliance is the adjustable thermostat 18, located in the oven 3, which is designed to close an electric circuit at variable predetermined temperatures. The closing temperature of this thermostat is regulated manually by the handle 19 shown in Fig. 2.

Underneath the insulated housing 1 is the base compartment 20, which encloses the control mechanism illustrated in Fig. 5 of the drawing. An essential part of this mechanism is the lead screw 21, having a detachable threaded engagement with the moving contact 22. This detachable engagement is exemplified in Fig. 6 of the drawing, in which, by pulling the knob 23 outwardly against the spring pressure, the threaded engagement between the screw 21 and the contact 22 is released so that the latter may be slid alongside the screw 21. This lead screw is rotated by a synchronous motor 30 so that the moving contact 22, when in threaded engagement with the screw, will always move in the direction of the arrow shown in Fig. 5.

Parallel to the lead screw 21 are the conducting rails 24, 25 and 26, with which the moving contact 22 is in sliding electrical contact during its path alongside the lead screw 21. Rail 24 is connected to the heating elements 6 and 7 of the oven 3, rail 25 is connected to the heating element 5 located under the hot-plate 4, and all three heating elements are further connected to the supply terminal 37 through a manual main switch 31. Rail 26 is connected to the other supply terminal 38. This rail 26 is slidable longitudinally, by means of knob 27, whereby the duration of the electrical contact between this rail and the moving contact 22 may be varied.

Scales 28 and 29 serve to indicate the positions of the moving contact 22 and the sliding rail 26, respectively. Connected in series with the heating element 5 is the relay 33, designed to close an electric circuit when current passes through this heating element 5. A similar relay 34 is inserted into the regulating circuit, which, starting from terminal 38, passes through thermostat 18 and solenoid operated lock 17, then, through relay 34 returns to the supply terminal 37. Switch 36 serves to by-pass the lock 17 when it is desired to make it inoperative. Limit switch 35 is designed to open the supply circuit of the synchronous motor 30 when it is reached by the moving contact 22, in order to limit its travel alongside the lead screw 21.

The operation of the cooking appliance will be as follows:

As an example, let us assume that the meal to be prepared will consist of toast made on the grate, a dish baked in the oven, and coffee, the water for which is boiled on the hot-plate. After depositing the food in the appliance, the grate is moved into the oven, leaving the pan outside. The thermostat is set for the toast. Knob 23 set on scale 28 corresponding to the time required for the baking in the oven. Knob 27 is set on scale 29 corresponding to the time required for the boiling of the water on the hot-plate. Main switch 31 is closed. When the oven temperature reaches the setting of the thermostat, the thermostat will close the regulating circuit, sending current through the lock 17 and relay 34. As a result of this, the spring pressed pinion 16 will move the grate, with the completed toast out of the oven, and will move the pan, with the uncooked dish into the oven and the relay 34 will start the motor 30 operating the time control. When the moving contact 22 passes from rail 24 to rail 25 the current is switched off in the oven and is switched on in the hot-plate, and it will continue until the moving contact 22 has passed the end of the adjustable rail 26. Finally, when the moving contact 22 reaches the limit switch 35 the supply circuit of the motor 30 is opened and the time control stops, completing the cooking operation.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims. Particularly, it is within the spirit of my invention to employ voltage transformation between the 110 volt supply circuit and the control circuit herein described, and to control the current of the heating elements indirectly by means of solenoid operated switches actuated by the siding contact herein described.

I claim:

1. An automatic electric cooking appliance for cooking a multiplicity of food in a prearranged sequence, comprising: a stove compartment covered by a hot-plate and enclosing an electric heating element; an oven compartment containing an upper and a lower heating element having a total watt capacity substantially equal to the capacity of the heating element in said stove compartment; a pan disposed between the heating elements of said oven compartment, being slidable outwardly from said oven compartment through an opening in one of the walls of said compartment; a grate disposed between the heating elements of said oven compartment, being slidable outwardly from said oven compartment through an opening in the opposite wall of said compartment; mechanical coupling between said pan and said grate, adapted to draw one from the outside into the oven compartment when the other one is moved outwardly from the oven compartment; a frame disposed in said oven compartment, being slidable outwardly in the same direction as said grate and being adapted to engage and carry said grate outwardly from said oven compartment whenever said frame is moving outwardly, said frame being provided with teeth; a torsional spring pressed pinion engaging the teeth of said frame, and being adapted to move said frame outwardly from the oven compartment; a solenoid operated lock adapted to lock said pinion against the spring pressure when said solenoid is not energized; a lead screw rotatable at a constant speed by a synchronous electric motor; two electrically conducting rails disposed in a line parallel to said lead screw, and connected to the heating elements of the stove and oven compartments, respectively; a sliding rail, disposed parallel to said screw, being adjustable in position longitudinally, and being connected to the electric supply terminal; a moving contact, having a detachable threaded connection with said lead screw, and adapted to electrically connect said sliding rail either with the rail connected to the heating element of the stove compartment, or with the rail connected to the heating elements of the oven compartment; means adapted to detach said moving contact from said screw and to slide it alongside said screw in order to regulate its starting position; an adjustable thermostat disposed in said oven compartment and adapted to energize said solenoid operated lock and start said synchronous motor at variable predetermined temperatures; a relay adapted to energize said motor when the heating element of the stove compartment carries current, a limit switch adapted to stop said motor when the moving contact reaches the end of its travel.

2. An automatic electric cooking appliance for cooking a multiplicity of food in a prearranged sequence, comprising: a stove compartment covered by a hot-plate and enclosing an electric heating element; an oven compartment containing an upper and a lower heating element; a pan disposed between the upper and the lower heating elements of said oven compartment, said pan being slidable through an opening in one of the walls of said oven compartment; a grate disposed between said upper and lower heating elements of said oven compartment, substantially parallel to said pan, said grate being slidable through an opening in one of the walls of said oven compartment; mechanical coupling between said pan and said grate, adapted to move one from the outside into the oven compartment when the other one is moved outwardly from the oven compartment; a spring pressed frame adapted to engage and move said grate outwardly from said oven compartment; a solenoid operated lock adapted to secure said frame against spring pressure when solenoid is not energized; a synchronous motor operated lead screw; two electrically conducting rails disposed substantially parallel to said lead screw and connected to the heating elements of the stove and oven compartments, respectively; a sliding rail, disposed substantially parallel to said lead screw, being adjustable in position longitudinally and being connected to the electric supply terminal; a moving contact having detachable threaded connection with said lead screw and being adapted to connect said sliding rail selectively to either of said two electrically conductive rails; means adapted to detach said moving contact from said screw and move it to engage another point of said screw in order to regulate its starting position; an adjustable thermostat disposed in said oven compartment and being adapted to energize said solenoid operated lock and start said synchronous motor operated screw at variable predetermined temperatures; a limit switch adapted to stop said lead screw when said moving contact has reached the end of its travel.

References Cited in the file of this patent

UNITED STATES PATENTS

| 1,416,009 | Forshee | May 16, 1922 |
| 1,677,361 | Mottlau | July 17, 1928 |
| 1,694,762 | Ackerman | Dec. 11, 1928 |
| 1,702,480 | Newsom | Feb. 19, 1929 |
| 2,282,489 | Madlem | May 12, 1942 |